Patented May 30, 1933

1,911,589

UNITED STATES PATENT OFFICE

FRIEDRICH STEINHÄUSER, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SYNTHESIS OF ACETYL CHLORIDE

No Drawing. Application filed March 14, 1929, Serial No. 347,188, and in Germany March 23, 1928.

The present invention relates to a new synthesis of acetyl chloride.

I have found that acetyl chloride can be obtained by synthesis from methyl chloride by heating it together with carbon monoxide especially by conducting it together with carbon monoxide at a raised temperature over certain catalysts. The acetyl chloride thus obtained may be isolated from the gas mixture for instance by cooling it to a very low degree or by absorption or the acetyl chloride contained in the gas mixture may be decomposed, without isolating it, into the acetic acid for instance by introducing it into water or the acetyl chloride may be converted into acetic anhydride by subjecting it to a reaction with acetic acid.

The reaction takes place according to the equation:

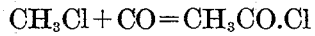
$$CH_3Cl + CO = CH_3CO.Cl$$

There may be used as catalysts for instance acids showing a low volatility at the reaction temperature, their anhydrides and salts, such as for instance phosphoric acid and alkali phosphates, boric acid, boric anhydride and alkali borates in form of their melts without or with a contact carrier.

The reaction is promoted by using a high pressure. In order to obtain a good yield it is also advantageous to work with an excess of carbon monoxide.

Temperatures above 600° C., especially those of about 700° C. to 800° C. are most suitable for the reaction.

The following example serves to illustrate the invention, but it is not intended to limit it thereto:

A mixture of 1 vol. of methyl chloride and 8 vol. of CO is conducted with a velocity of 10 cm/sec. over a sodium metaphosphate contact. The metaphosphate is to be melted and spread upon pumice stone in such a manner that the surface of the pumice stone is uniformly covered therewith. The contact zone is kept at a temperature of between 700° C. and 800° C. The reaction product is cooled behind the contact to about −10° C. Acetyl chloride then separates which is purified by fractional distillation from methyl chloride likely to be admixed. The gas mixture which escapes from the cooling vessels and is regenerated by adding the consumed quantity of methyl chloride and carbon monoxide can be returned into the process.

There is obtained, under atmospheric pressure, a yield of acetyl chloride amounting to 10-12 per cent calculated upon the methyl chloride used by conducting the mixture once over a contact. This yield can be considerably increased by applying overpressure.

It has, of course, to be taken care that all substances which cause decomposition of the gas mixture with elimination of carbon be excluded from the reaction chamber and from the hot conduits. It has been found to be especially suitable to use porcelain, quartz or the like which have been coated with phosphate glaze. Suitable materials for conduits which have only to withstand temperatures of an average degree, are also lead and silver.

In the following claims the salts of the acids used as contact substances are intended to comprise also their equivalents, the free acids and the anhydrides thereof insofar as they show a low volatility at the reaction temperature.

I claim:

1. A new synthesis of acetyl chloride, which comprises conducting methyl chloride mixed with carbon monoxide at a temperature between 600° C. and 800° C. over a sodium metaphosphate contact.

2. A process of synthesizing acetyl chloride which comprises conducting methyl chloride mixed with carbon monoxide at a temperature between 600° C. and 800° C. over an alkali metal salt of a weak inorganic acid showing a low volatility at the reaction temperature.

3. A process of synthesizing acetyl chloride which comprises conducting methyl chloride mixed with carbon monoxide at a temperature between 600° C. and 800° C. over an alkali metal borate contact.

4. A process for synthesizing acetyl chloride which comprises contacting methyl chloride mixed with carbon monoxide at a temperature between 600° C. and 800° C. with a catalyst selected from the class consisting of weak inorganic acids having a low volatility at the reaction temperature, their anhydrides and alkali metal salts.

In testimony whereof, I affix my signature.

FRIEDRICH STEINHÄUSER.